(12) United States Patent
Brooks

(10) Patent No.: US 10,214,073 B2
(45) Date of Patent: Feb. 26, 2019

(54) AIRFLOW CONTROL SYSTEM FOR AN AGRICULTURAL MACHINE

(71) Applicant: CNH Industrial America LLC, New Holland, PA (US)

(72) Inventor: Nathan Brooks, Manitowoc, WI (US)

(73) Assignee: CNH Industrial America LLC, New Holland, PA (US)

( * ) Notice: Subject to any disclaimer, the term of this patent is extended or adjusted under 35 U.S.C. 154(b) by 155 days.

(21) Appl. No.: 15/457,176

(22) Filed: Mar. 13, 2017

(65) Prior Publication Data
US 2018/0257454 A1    Sep. 13, 2018

(51) Int. Cl.
*B60H 1/00* (2006.01)
*B60K 11/06* (2006.01)
*B60K 11/00* (2006.01)

(52) U.S. Cl.
CPC ..... *B60H 1/00271* (2013.01); *B60H 1/00807* (2013.01); *B60H 1/00878* (2013.01); *B60K 11/00* (2013.01); *B60K 11/06* (2013.01); *B60H 2001/003* (2013.01); *B60H 2001/00992* (2013.01)

(58) Field of Classification Search
CPC ............ B60H 1/00271; B60H 1/00807; B60H 1/00878; B60H 2001/003; B60H 2001/00992; B60K 11/06; B60K 11/00
See application file for complete search history.

(56) References Cited

U.S. PATENT DOCUMENTS

| | | |
|---|---|---|
| 5,275,012 A | 1/1994 | Dage et al. |
| 5,427,313 A | 6/1995 | Davis, Jr. et al. |
| 5,547,125 A | 8/1996 | Hennessee et al. |
| 5,833,133 A | 11/1998 | Dage |
| 5,993,312 A | 11/1999 | Panoushek et al. |
| 6,116,511 A | 9/2000 | Jakobcic et al. |
| 6,234,398 B1 | 5/2001 | Pawlak, III et al. |
| 6,304,803 B1 | 10/2001 | Dao |
| 6,732,939 B1 | 5/2004 | Wang et al. |
| 6,988,670 B2 | 1/2006 | Keen et al. |
| 7,128,141 B2 | 10/2006 | Ping et al. |
| 7,681,630 B2 | 3/2010 | Klassen et al. |
| 8,056,617 B2 | 11/2011 | Klassen et al. |

(Continued)

FOREIGN PATENT DOCUMENTS

KR    100754054    8/2002

*Primary Examiner* — Thomas G Black
*Assistant Examiner* — Sze-Hon Kong
(74) *Attorney, Agent, or Firm* — Rebecca L. Henkel; Rickard K. DeMille

(57) ABSTRACT

Agricultural machines such as sprayers can be improved by providing a control system configured to adjust an engine cooling package fan with variable speeds, to thereby minimize parasitic losses, based on progress of the HVAC system for attaining a desired temperature in the operator cab. In one aspect, as a gap between actual and desired temperatures (temperature differential) in the cab minimizes, the cooling package fan can be variably adjusted to increase or decrease in speed, depending on heating or cooling occurring in the cab, respectively. However, if a temperature of an area in the engine compartment reaches a predetermined threshold, such variable speed control can cease, and the cooling package fan can instead be controlled to cool the area.

20 Claims, 4 Drawing Sheets

(56) References Cited

U.S. PATENT DOCUMENTS

| | | | |
|---|---|---|---|
| 8,209,073 B2* | 6/2012 | Wijaya | B60H 1/3205 165/42 |
| 8,280,584 B2 | 10/2012 | Mikat | |
| 8,714,116 B2 | 5/2014 | Hartman et al. | |
| 2007/0266964 A1* | 11/2007 | Soderberg | B60H 1/00271 123/41.11 |
| 2010/0190429 A1 | 7/2010 | Dage | |
| 2011/0105005 A1 | 5/2011 | Spaggiari | |
| 2013/0203333 A1 | 8/2013 | Amura et al. | |
| 2014/0096547 A1 | 4/2014 | Boehde | |
| 2014/0360211 A1 | 12/2014 | Hovel et al. | |
| 2015/0114020 A1 | 4/2015 | Bergman | |
| 2015/0191073 A1 | 7/2015 | Bjorkerud et al. | |
| 2016/0201545 A1* | 7/2016 | Kanehama | F15B 11/08 60/456 |
| 2018/0045297 A1* | 2/2018 | Gonze | F16H 57/0415 |
| 2018/0051933 A1* | 2/2018 | Meyer | B60K 11/04 |
| 2018/0086181 A1* | 3/2018 | Connell | B60H 1/00657 |

* cited by examiner

AIRFLOW CONTROL SYSTEM FOR AN AGRICULTURAL MACHINE

FIELD OF THE INVENTION

The invention relates generally to agricultural product application equipment such as self-propelled sprayers and, in particular, to an airflow control system for agricultural machines in which a first airflow system is configured to heat or cool an operator cab, a second airflow system is configured to cool an area in an engine compartment, and a temperature differential between a temperature request value for the operator cab and an actual temperature in the operator cab can be used to adjust the second airflow system.

BACKGROUND OF THE INVENTION

Agricultural machines such as high-clearance sprayers typically have an operator cab and an engine compartment housing various components for the machine, such as an engine and drive system. To keep the engine cool, an engine cooling package fan is typically provided in the engine compartment. The engine cooling package fan can draw ambient air into the engine compartment housing to cool through heat exchangers to perform numerous cooling functions. This can include cooling engine coolant, hydraulic oil, charged air, and the like.

However, rotating an engine cooling package fan requires power which, in turn, causes a parasitic power loss in the system. For example, for engine cooling package fans that are hydraulically driven, rotating such fans reduces the hydraulic power that is available for other components in the hydraulic system.

To reduce such parasitic effects, some cooling package fans are operated at variable speeds. Such variable speed fans can be operated at slower speeds to consume less power when less cooling is needed, and at faster speeds which may consume more power when more cooling is needed. The amount of cooling needed can be determined by sensed temperature(s) in the engine compartment, such as with respect to engine coolant, hydraulic oil and/or charged air.

However, when an Air Conditioning (AC) unit of Heating, Ventilation and Air Conditioning (HVAC) system as running, such variable control is deactivated and the cooling package fan is operated at full speed. As a result, with a substantial amount of in-field agricultural equipment operation running during warm weather, operation of the AC results in a substantial power loss in the system due to the continuous parasitic loss caused by the cooling package fan. This can defeat the purpose of variable speed capability for the fan. A need therefore exists for an improved system which eliminates one or more of the foregoing disadvantages.

SUMMARY OF THE INVENTION

Agricultural machines such as sprayers can be improved by providing a control system configured to adjust an engine cooling package fan with variable speeds, to thereby minimize parasitic losses, based on progress of the HVAC system for attaining a desired temperature in the operator cab. In one aspect, as a gap between actual and desired temperatures (temperature differential) in the cab minimizes, the cooling package fan can be variably adjusted to increase or decrease in speed, depending on heating or cooling occurring in the cab, respectively. However, if a temperature of an area in the engine compartment reaches a predetermined threshold, such variable speed control can cease, and the cooling package fan can instead be controlled to cool the area.

According to an aspect of the invention, a temperature sensor(s) in the cab can be used by an HVAC controller to determine a temperature delta value at the cab. The rotational speed of a cooling package fan can then be variably controlled based on the temperature delta value.

In one aspect, the cooling package fan speed can be controlled based on a temperature delta at the cab in addition to coolant temperature, hydraulic oil temperature, and/or charged air temperature. The HVAC controller can sense temperature both inside and outside the cab to help determine whether cooling or heating of the cab is being performed. During cab cooling, the further the actual temperature is from the requested temperature, the faster the fan can be commanded to rotate. Conversely, the closer the actual temperature is to the requested temperature, the slower the fan can be commanded to rotate. A generally inverse control can be used during cab heating situations, including leaving the fan off to help quickly warm the engine coolant and the air inside the cab.

Specifically then, one aspect of the present invention may provide an airflow control system for an agricultural machine including: an operator cab; a first airflow system configured to heat or cool the operator cab; a temperature sensor configured to sense a temperature in the operator cab; an engine compartment; a second airflow system configured to cool an area in the engine compartment; and a controller in communication with the first and second airflow systems and the temperature sensor. The controller can execute a program stored in a non-transient medium operable to: (a) receive a command for adjusting a temperature in the operator cab to a temperature request value; (b) control the first airflow system to change the temperature in the operator cab to the temperature request value; (c) during step (b), determine a temperature differential by calculating a difference between the temperature request value and the temperature in the operator cab; and (d) adjust the second airflow system to cool the area in the engine compartment according to the temperature differential.

Another aspect may provide a method for controlling airflow for an agricultural machine including: heating or cooling an operator cab with a first airflow system; sensing a temperature in the operator cab with a temperature sensor; cooling an area in an engine compartment with a second airflow system; receiving a command for adjusting a temperature in the operator cab to a temperature request value; controlling the first airflow system to change the temperature in the operator cab to the temperature request value; while controlling the first airflow system to change the temperature in the operator cab, determine a temperature differential by calculating a difference between the temperature request value and the temperature in the operator cab; and adjusting the second airflow system to cool the area in the engine compartment according to the temperature differential.

Another aspect may provide an agricultural sprayer including: a chassis supported by multiple wheels, the chassis supporting an engine compartment, a drive system, a lift arm assembly and an operator cab; a sprayer boom connected to the lift arm assembly; a first airflow system configured to heat or cool the operator cab; a temperature sensor configured to sense a temperature in the operator cab; a second airflow system including a fan configured to cool an area in the engine compartment; a controller in communication with the first and second airflow systems and the temperature sensor. The controller can execute a program stored in a non-transient medium operable to: (a) receive a command for adjusting a temperature in the operator cab to a temperature request value; (b) control the first airflow system to change the temperature in the operator cab to the temperature request value; (c) during step (b), determine a temperature differential by calculating a difference between the temperature request value and the temperature in the operator cab; and (d) adjust the second airflow system by adjusting a rotational speed of the fan to cool the area in the engine compartment according to the temperature differential.

Accordingly, in one aspect, the engine cooling package fan can be variably controlled according to a cooling function of the operator cab, which cooling function can be provided by an AC unit of an HVAC. In addition, the engine cooling package fan can be variably controlled according to a heating function of the operator cab, which heating function can be provided by a heating unit of the HVAC. While such variable control of the engine cooling package fan is occurring, temperature sensors can monitor areas in the engine compartment that are being cooled by the engine cooling package fan, such as engine coolant, hydraulic oil and/or charged air. Accordingly, if any one temperature sensor indicates an elevated temperature in the engine compartment, the variable control of the engine cooling package fan can be halted, and the engine cooling package fan can instead be controlled at an elevated or maximum level until the temperature sensors indicate temperatures of the monitored areas in the engine compartment are no longer elevated, at which point the aforementioned variable control can resume with monitoring.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
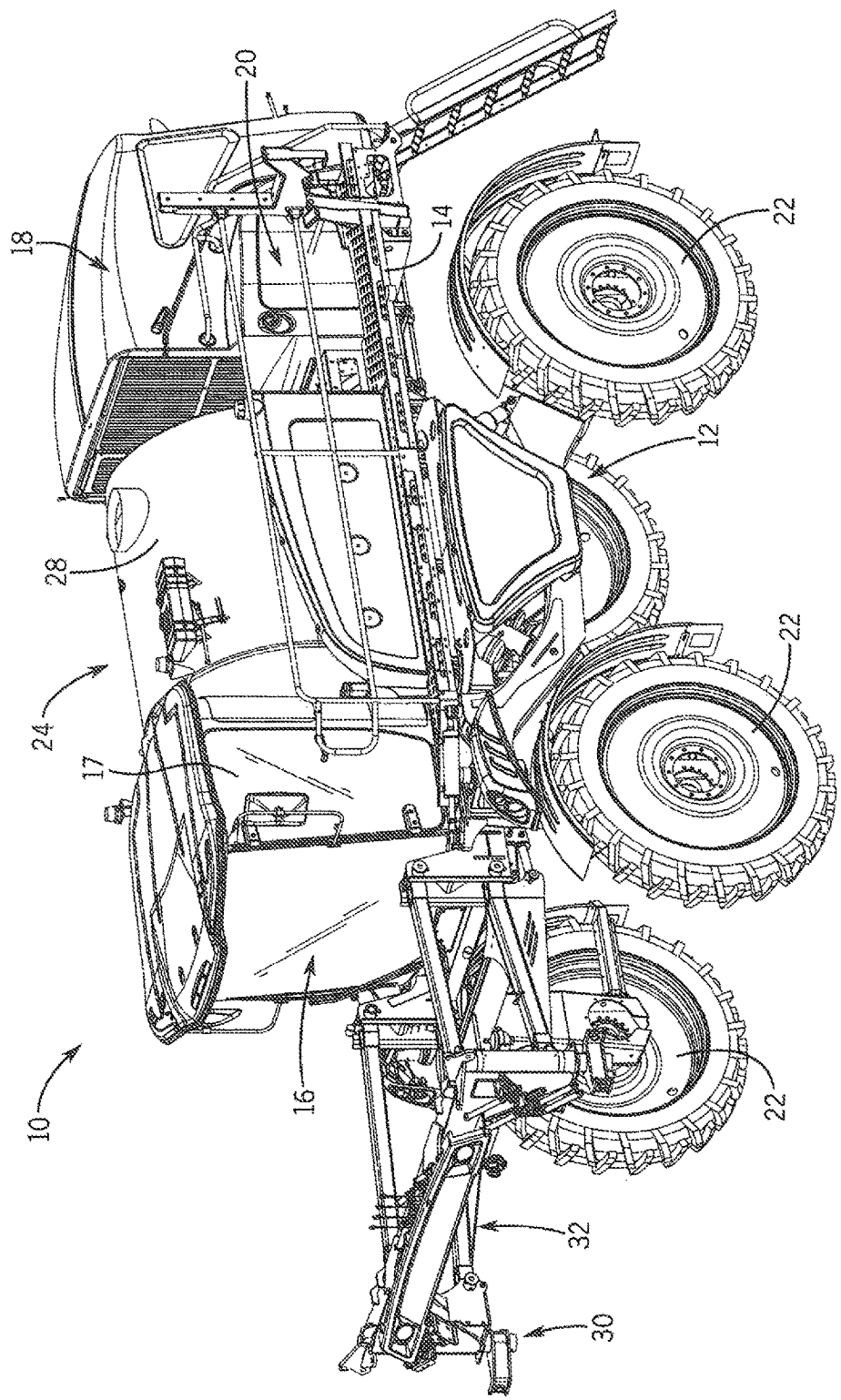
FIG. 1 is an isometric view of an agricultural machine in accordance with an aspect of the invention.

Referring now to the drawings and specifically to FIG. 1, aspects of the invention are shown for use with an agricultural machine which could be an agricultural sprayer. The agricultural sprayer is shown here as a self-propelled agricultural sprayer vehicle or self-propelled sprayer 10. Although sprayer 10 is shown as a front-mounted boom self-propelled sprayer, it is understood that self-propelled versions of sprayer 10 can have either front-mounted or rear-mounted booms, such as those available from CNH Industrial, including the Miller Nitro and Condor Series sprayers and New Holland Guardian Series sprayers.

Still referring to FIG. 1, sprayer 10 includes a chassis 12 having a chassis frame 14 that supports various assemblies, systems, and components. These various assemblies, systems, and components can include an operator cab 16, a spray system 24, and an engine compartment 17 housing an engine 18 and a hydraulic system 20, among other things. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings. The spray system 24 can include storage containers such as rinse tank for storing water or a rinsing solution and a product tank 28 for storing a volume of product for delivery onto an agricultural field with sprayer 10. A product delivery pump can convey product from the product tank 28 through plumbing components such as interconnected pieces of tubing and through a boom tubing system for release out of spray nozzles that are spaced from each other along the width of boom 30 during spraying operations of sprayer 10. Groups or banks of multiple adjacent spray nozzles define multiple spray sections of the spray system. Spray sections are defined along boom 30 and selectively deliver product for release onto an agricultural field at locations corresponding to positions of activated spray sections. Boom 30 is connected to chassis 12 with lift arm assembly 32 that is configured to move the boom 30 up and down for adjusting the height of application of the product.

Figure 2:
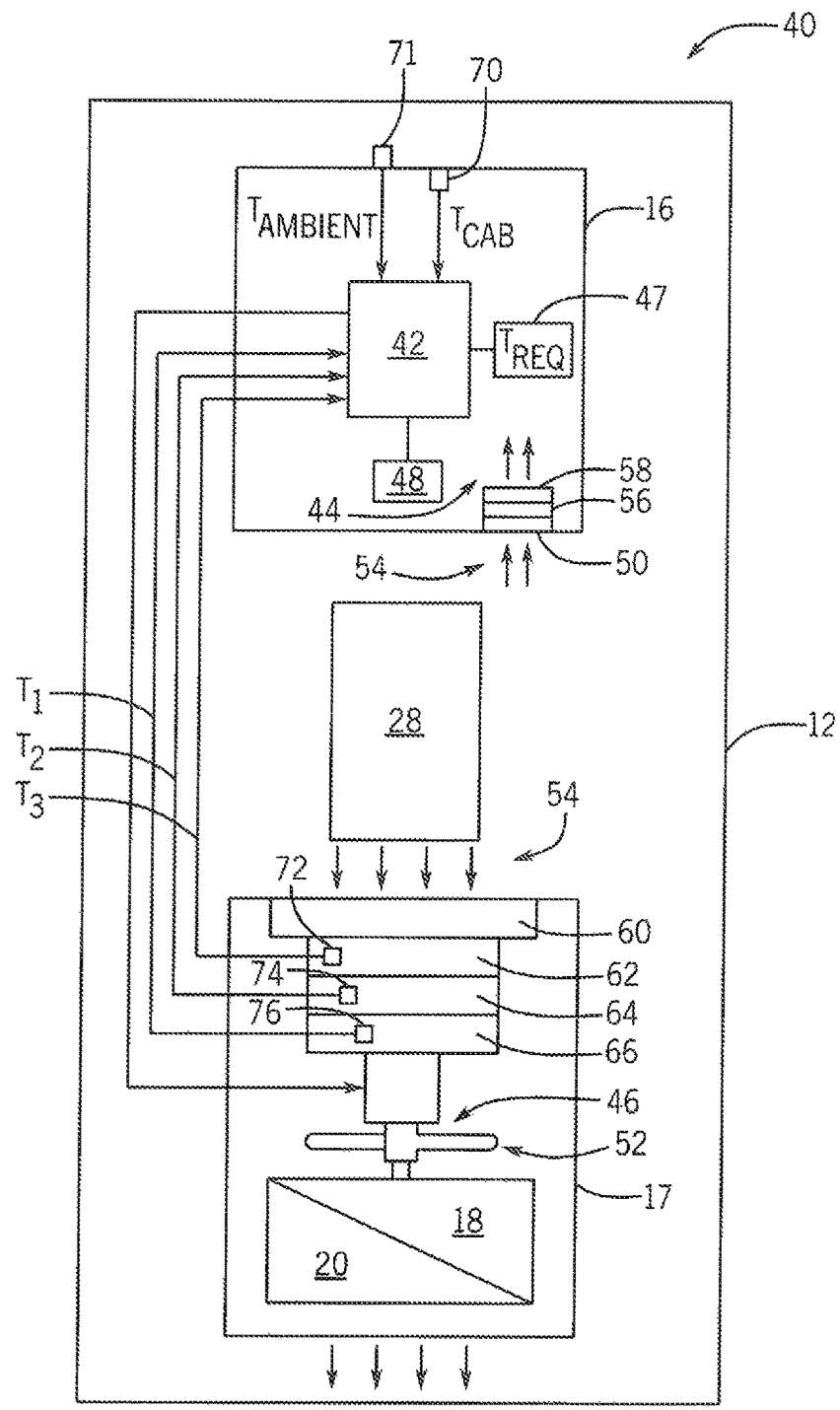
FIG. 2 is block diagram of an airflow control system implemented with respect to the machine of FIG. 1 in accordance with an aspect of the invention.

Referring now to FIG. 2, a block diagram of an airflow control system 40 which may be implemented with respect to the sprayer 10 is provided in accordance with an aspect of the invention. The airflow control system 40 can include a controller 42 in communication with a first airflow system 44, a second airflow system 46, a Human Machine Interface (HMI) 47 and multiple sensors as will be described. The controller 42 can be a microprocessor, a microcontroller or other programmable logic element configured to execute a program stored in a non-transient medium 48 as known the art. The first and second air flow systems can include first and second fans 50 and 52, respectively, for providing such airflows. The controller 42 can be in communication with the first airflow system 44, which can comprise a Heating, Ventilation and Air Conditioning (HVAC) having a heating unit and an Air Conditioning (AC), for controlling operation of airflow to heat or cool the operator cab 16 to a temperature request value (labelled "$T_{REQ}$"); as may be commanded by an operator in the cab via the HMI 47. Accordingly, the first airflow system 44 can draw ambient air 54 through an air filter 56 and/or mixing chamber 58 (providing recirculation with air already in the cab) and into the operator cab 16. The controller 42 can also be in communication with the second airflow system 46 for cooling one or more areas in the engine compartment 17 to prevent overheating of such areas. Accordingly, the second airflow system 46 can draw ambient air 54 through an air filter 60, across areas corresponding to engine coolant 62, hydraulic oil 64 and/or charged air 66, and past the engine 18 and/or hydraulic system 20, to cool such areas. The multiple sensors in the airflow control system 40, in communication with the controller 42, can include, for example: a first temperature sensor 70 configured to sense a temperature in the operator cab 16 (labelled "$T_{CAB}$"); a second temperature sensor 71 configured to sense a temperature external to the operator cab 16 (labelled "$T_{AMBIENT}$"); and third, fourth and fifth temperature sensor 72, 74 and 76 configured to sense a temperatures in areas in the engine compartment 17, such as the engine coolant 62 (labelled "$T_1$"), the hydraulic oil 64 (labelled "$T_2$") and the charged air 66 (labelled "$T_3$"), respectively.

Figure 3:
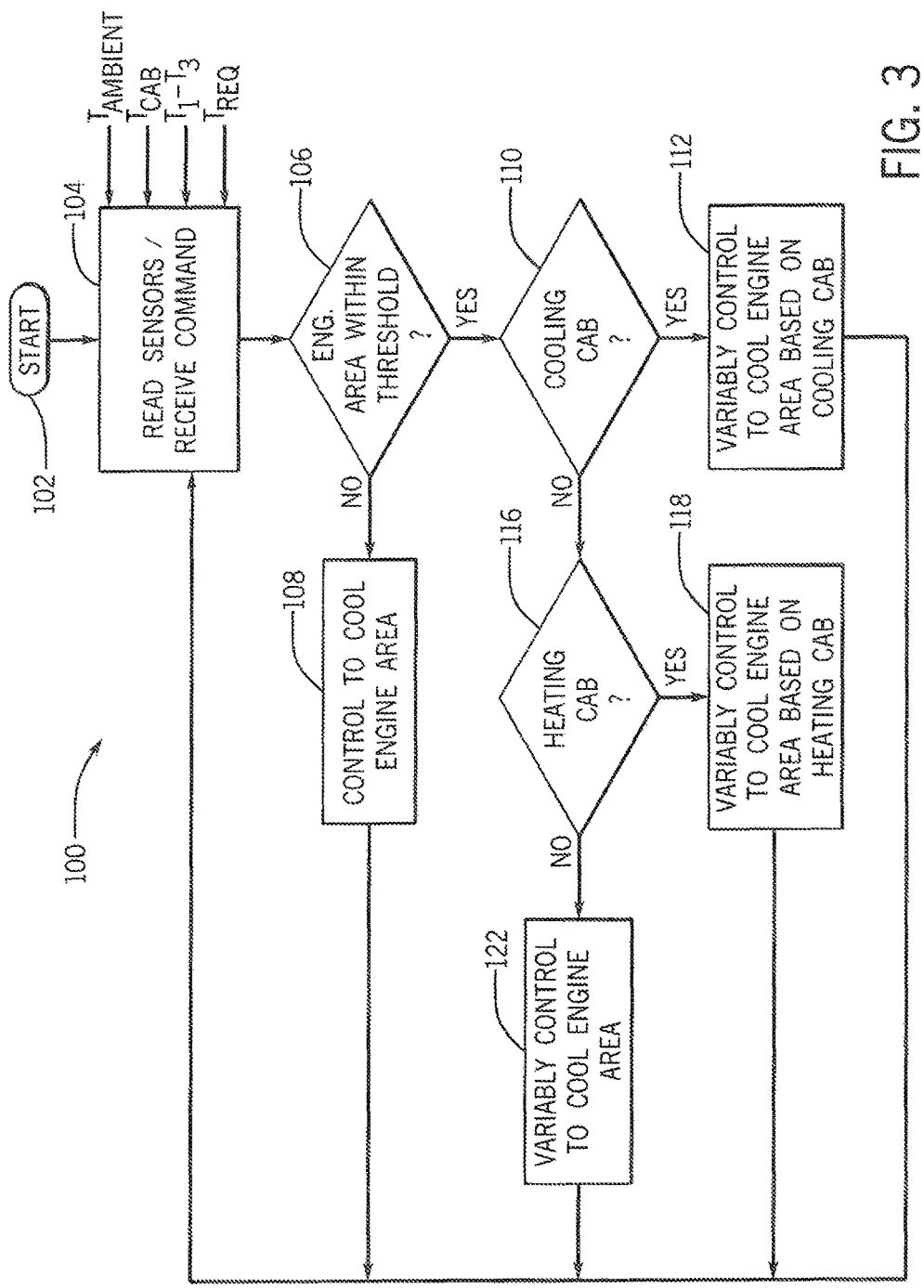
FIG. 3 is a flow chart for the airflow control system of FIG. 2.

With additional reference to FIG. 3, a flow diagram 100, which can be executed by the controller 42 in the airflow control system 40, is shown by way of example. In operation, following power-up/initialization at block 102, the controller 42 can read all sensors in the airflow control system 40, including the first, second, third, fourth and fifth temperature sensors 70, 71, 72, 74 and 76, respectively, at block 104. In addition, the controller 42 can receive a command for the operator for adjusting a temperature in the operator cab 16 to the temperature request value $T_{REQ}$ at block 104. The controller 42 can control begin to control the first airflow system 44 to change the temperature in the operator cab 16 to the temperature request value $T_{REQ}$.

Next, at decision block 106, the controller 42 can determine if temperatures in areas in the engine compartment 17, such as $T_1$, $T_2$ or $T_3$, are within acceptable limits, which may be set be predetermined thresholds as appropriate for the functions of such areas. If a temperature in an area in the engine compartment 17 is not within an acceptable limit as indicated by a corresponding predetermined threshold being reached, the process can continue to block 108 in which the controller 42 adjusts the second airflow system 46 to increase cooling of the area in the engine compartment. The process can then return to block 104 to read the sensors and receive commands. This first loop, between block 104, decision block 106, and block 108, can continue as long as the controller 42 determines that one or more temperatures in areas in the engine compartment 17 are not within an acceptable limit. Moreover, the controller 42 can apply hysteresis with respect to this loop to minimize undesirable frequent changes due to minor temperature variations.

Figure 4:
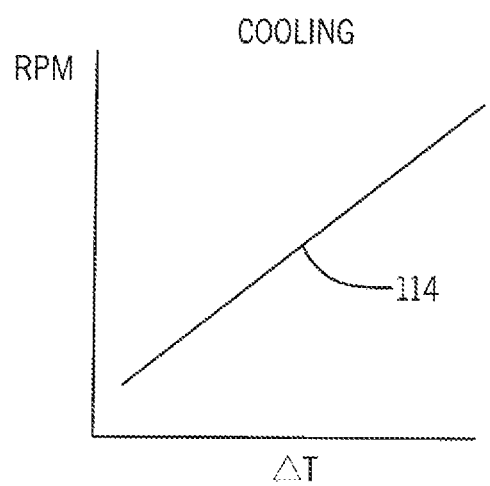
FIG. 4 is an exemplar graph for adjusting an airflow system of FIG. 2 to cool an area in the engine compartment during cooling of the operator cab.

However, at decision block 106, if the controller 42 determines the temperatures in areas in the engine compartment 17 are within an acceptable limit, the process can continue to decision block 110 in which the controller 42 determines if the first airflow system 44 is cooling the operator cab 16, such as by the AC unit of the HVAC. The controller 42 can determine if the cab is cooling, for example, by comparing the temperature in the operator cab $T_{CAB}$ to the temperature request value $T_{REQ}$ to determine if the temperature request value $T_{REQ}$ is less. In addition, or alternatively, the controller 42 can determine if the cab is cooling by comparing the temperature in the operator cab $T_{CAB}$ to the temperature external to the operator cab $T_{AMBIENT}$. If the cab is cooling, the process can continue to block 112 in which the controller 42 determines a temperature differential (labelled "$\Delta T$") by calculating a difference between the temperature request value $T_{REQ}$ and the temperature in the $T_{CAB}$ operator cab 16 as the cab is cooling. With additional reference to FIG. 4, the controller 42 can adjust the second airflow system 46 to variably cool areas in the engine compartment 17, by adjusting a rotational speed of the fan 52 (label led "RPM" for revolutions per minute) according to the determined temperature differential $\Delta T$. As shown by the graph 114, during cooling of the operator cab 16, the controller 42 can adjust the second airflow system 46 to decrease cooling of areas in the engine compartment 17 with a decrease in the temperature differential $\Delta T$. With a variable speed set for the fan 52, the process can then return to block 104 to read the sensors and receive commands. This loop can continue, with variable speed being adjusted, as long as the controller 42 determines that temperatures in areas in the engine compartment 17 are within acceptable limits and the first airflow system 44 is cooling the operator cab 16. However, if a temperature in an area in the engine compartment 17 is no longer within an acceptable limit, the controller 42 can cease variably adjusting the second airflow system 46, and instead adjust the second airflow system 46 to increase cooling of the area in the engine compartment block 108, such as by maximizing RPM of the fan 52, as provided at block 108.

Figure 5:
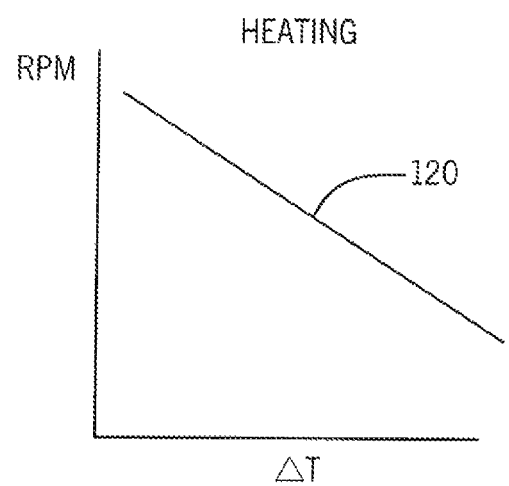
FIG. 5 is an exemplar graph for adjusting an airflow system of FIG. 2 to cool an area in the engine compartment during heating of the operator cab.

However, if at decision block 110 the controller 42 determines that the operator cab 16 is not cooling, the process can instead continue to decision block 116 in which the controller 42 determines if the first airflow system 44 is heating the operator cab 16, such as the heating unit of the HVAC. Similar to the cooling flow, the controller 42 can determine if the cab is heating, for example, by comparing the temperature in the operator cab $T_{CAB}$ to the temperature request value $T_{REQ}$ to determine if the temperature request value $T_{REQ}$ is greater. In addition, or alternatively, the controller 42 can determine if the cab is heating by comparing the temperature in the operator cab $T_{CAB}$ to the temperature external to the operator cab $T_{AMBIENT}$. If the cab is heating, the process can continue to block 118 in which the controller 42 determines a temperature differential (labelled "$\Delta T$") by calculating a difference between the temperature request value $T_{REQ}$ and the temperature in the $T_{CAB}$ operator cab 16 as the cab is heating. With additional reference to FIG. 5, the controller 42 can adjust the second airflow system 46 to variably cool areas in the engine compartment 17, by adjusting a rotational speed of the fan 52 (labelled "RPM" for revolutions per minute) according to the determined temperature differential $\Delta T$. As shown by the graph 120, during heating of the operator cab 16, the controller 42 can adjust the second airflow system 46 to increase cooling of areas in the engine compartment 17 with a decrease in the temperature differential $\Delta T$. With a variable speed set for the fan 52, the process can then return to block 104 to read the sensors and receive commands. This loop can continue, with variable speed being adjusted, as long as the controller 42 determines that temperatures in areas in the engine compartment 17 are within acceptable limits and the first airflow system 44 is heating the operator cab 16. Moreover, it will be appreciated that the ordering of heating/cooling in the process can be changed, and that the process could go between heating/cooling flows during operation. The controller 42 can apply hysteresis to minimize undesirable frequent changes between heating/cooling loops due to minor temperature variations. However, if a temperature in an area in the engine compartment 17 is no longer within an acceptable limit, the controller 42 can cease variably adjusting the second airflow system 46, and instead adjust the second airflow system 46 to increase cooling of the area in the engine compartment block 108, such as by maximizing RPM of the fan 52, as provided at block 108.

However, if at decision block 116 the controller 42 determines that the operator cab 16 is not heating, the process can instead continue to block 122 in which the controller 42 can adjust the second airflow system 46 to cool areas in the engine compartment 17 without regard to the first airflow system 44. This may be preferable, for example, when temperatures in areas in the engine compartment 17 are within acceptable limits and a command for adjusting a temperature in the operator cab 16 to a temperature request value $T_{REQ}$ has not been received, such as when operating with a window open, or such command has been received but has been sufficiently satisfied without the need for additional operation of the first airflow system 44. The process can then return to block 104 to read the sensors and receive commands, and this loop can similarly continue.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

I claim:

1. An airflow control system for an agricultural machine comprising:
    an operator cab;
    a first airflow system configured to heat or cool the operator cab;
    a temperature sensor configured to sense a temperature in the operator cab;
    an engine compartment;
    a second airflow system configured to cool an area in the engine compartment;
    a controller in communication with the first and second airflow systems and the temperature sensor, the controller executing a program stored in a non-transient medium operable to:
    (a) receive a command for adjusting a temperature in the operator cab to a temperature request value;
    (b) control the first airflow system to change the temperature in the operator cab to the temperature request value;
    (c) during step (b) determine a temperature differential by calculating a difference between the temperature request value and the temperature in the operator cab; and
    (d) adjust the second airflow system to cool the area in the engine compartment according to the temperature differential.

2. The airflow control system of claim 1, wherein the second airflow system comprises a fan, and wherein the controller adjusts a rotational speed of the fan according to the temperature differential.

3. The airflow control system of claim 2, wherein the controller determines a plurality of temperature differentials for adjusting the rotational speed of the fan a plurality of times.

4. The airflow control system of claim 1, wherein the temperature sensor is a first temperature sensor, and further comprising a second temperature sensor configured to sense a temperature external to the operator cab, wherein the controller compares the temperature in the operator cab to the temperature external to the operator cab to determine whether the first airflow system is heating or cooling the operator cab.

5. The airflow control system of claim 4, wherein, during heating of the operator cab, the controller is configured to adjust the second airflow system to increase cooling of the area in the engine compartment with a decrease in the temperature differential.

6. The airflow control system of claim 4, wherein, during cooling of the operator cab, the controller is configured to adjust the second airflow system to decrease cooling of the area in the engine compartment with a decrease in the temperature differential.

7. The airflow control system of claim 1, wherein the temperature sensor is a first temperature sensor, and further comprising a second temperature sensor configured to sense a temperature of the area in the engine compartment, wherein the controller is configured to cease step (d) and adjust the second airflow system to increase cooling of the area in the engine compartment when the temperature of the area in the engine compartment reaches a predetermined threshold.

8. The airflow control system of claim 7, wherein the area in the engine compartment corresponds to at least one of engine coolant, hydraulic oil and charged air.

9. The airflow control system of claim 1, further comprising a Human Machine Interface (HMI) in the operator cab, wherein the controller is configured to receive the command from an operator via the HMI.

10. A method for controlling airflow for an agricultural machine comprising:
    heating or cooling an operator cab with a first airflow system;
    sensing a temperature in the operator cab with a temperature sensor;
    cooling an area in an engine compartment with a second airflow system;
    receiving a command for adjusting a temperature in the operator cab to a temperature request value;
    controlling the first airflow system to change the temperature in the operator cab to the temperature request value;
    while controlling the first airflow system to change the temperature in the operator cab, determine a temperature differential by calculating a difference between the temperature request value and the temperature in the operator cab; and
    adjusting the second airflow system to cool the area in the engine compartment according to the temperature differential.

11. The method of claim 10, wherein the second airflow system comprises a fan, and wherein adjusting the second airflow system comprises adjusting a rotational speed of the fan.

12. The method of claim 11, further comprising determining a plurality of temperature differentials for adjusting the rotational speed of the fan a plurality of times.

13. The method of claim 10, wherein the temperature sensor is a first temperature sensor, and further comprising:
    sensing a temperature external to the operator cab with a second temperature sensor; and
    comparing the temperature in the operator cab to the temperature external to the operator cab to determine whether the first airflow system is heating or cooling the operator cab.

14. The method of claim 13, further comprising, during heating of the operator cab, adjusting the second airflow system to increase cooling of the area in the engine compartment with a decrease in the temperature differential.

15. The method of claim 13, further comprising, during cooling of the operator cab, adjusting the second airflow system to decrease cooling of the area in the engine compartment with a decrease in the temperature differential.

16. The method of claim 10, wherein the temperature sensor is a first temperature sensor, and further comprising;
sensing a temperature of the area in the engine compartment a second temperature sensor; and
ceasing the adjusting of the second airflow system to cool the area in the engine compartment according to the temperature differential and adjusting the second airflow system to increase cooling of the area in the engine compartment when the temperature of the area in the engine compartment reaches a predetermined threshold.

17. The method of claim 16, wherein the area in the engine compartment corresponds to at least one of engine coolant, hydraulic oil and charged air.

18. The method of claim 10, further comprising receiving the command from an operator via a Human Machine Interface (HMI) in the operator cab.

19. An agricultural sprayer comprising:
a chassis supported by a plurality of wheels, the chassis supporting an engine compartment, a drive system, a lift arm assembly and an operator cab;
a sprayer boom connected to the lift arm assembly;
a first airflow system configured to heat or cool the operator cab;
a temperature sensor configured to sense a temperature in the operator cab;
a second airflow system comprising a fan configured to cool an area in the engine compartment;
a controller in communication with the first and second airflow systems and the temperature sensor, the controller executing a program stored in a non-transient medium operable to:
(a) receive a command for adjusting a temperature in the operator cab to a temperature request value;
(b) control the first airflow system to change the temperature in the operator cab to the temperature request value;
(c) during step (b), determine a temperature differential by calculating a difference between the temperature request value and the temperature in the operator cab; and
(d) adjust the second airflow system by adjusting a rotational speed of the fan to cool the area in the engine compartment according to the temperature differential.

20. The agricultural sprayer of claim 19, further comprising determining a plurality of temperature differentials for adjusting the rotational speed of the fan a plurality of times.

* * * * *